United States Patent [19]
Todd et al.

[11] B 3,913,668

[45] Oct. 21, 1975

[54] MARINE RISER ASSEMBLY

[75] Inventors: William W. Todd, Stavanger, Norway; William T. Ilfrey; James R. Lloyd, both of Houston, Tex.

[73] Assignee: Exxon Production Research Company, Houston, Tex.

[22] Filed: Aug. 22, 1973

[21] Appl. No.: 390,679

[44] Published under the Trial Voluntary Protest Program on January 28, 1975 as document no. B 390,679.

[52] U.S. Cl. ............... 166/.5; 285/137 R; 285/261
[51] Int. Cl.² ......................................... E21B 7/12
[58] Field of Search ................. 166/.5, .6; 175/5, 7; 285/261, 137 R

[56] References Cited
UNITED STATES PATENTS

| | | |
|---|---|---|
| 3,189,098 | 6/1965 | Haeber ............................ 166/.6 |
| 3,330,340 | 7/1967 | Hayes et al. ..................... 166/.6 |
| 3,701,551 | 10/1972 | Morgan ........................... 166/.5 X |
| 3,718,183 | 2/1973 | Scott ............................... 166/.5 |

*Primary Examiner*—Ernest R. Purser
*Assistant Examiner*—Richard E. Favreau
*Attorney, Agent, or Firm*—James E. Reed

[57] ABSTRACT

A marine riser assembly for use in offshore drilling operations includes a riser pipe, a ball joint in the riser pipe near its lower end, and steel kill and choke lines extending down the riser pipe to points below the ball joint, the kill and choke lines being attached to the riser pipe at points above the ball joint and including helical sections which extend around the ball joint and adjacent portions of the riser pipe through an angle of at least about 360° and at a radial distance from the ball joint and riser pipe sufficient to permit lateral flexing of the ball joint without exceeding the maximum allowable stresses for the helical sections.

9 Claims, 2 Drawing Figures

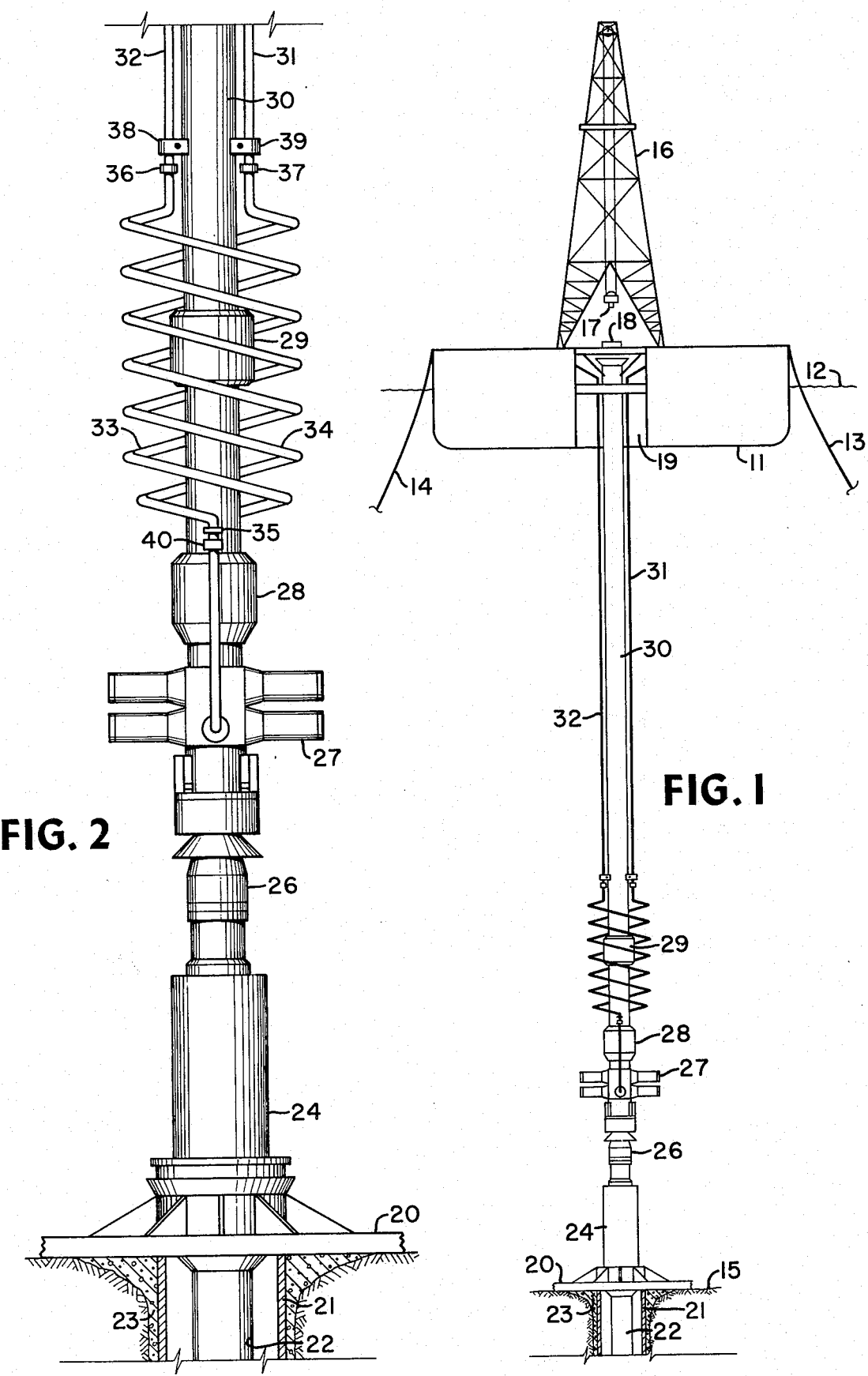

MARINE RISER ASSEMBLY

BACKGROUND OF THE INVENTION

1. Field of the Invention

This invention relates to marine risers for use in offshore drilling operations and is particularly concerned with riser assemblies provided with external kill and choke lines or similar auxiliary conduits.

2. Description of the Prior Art

Offshore drilling operations conducted from floating vessels normally involve the use of marine risers containing ball joints designed to accommodate motion of the vessel with respect to the wellhead and other equipment on the ocean floor. Such equipment usually includes a blowout preventer which can be hydraulically actuated from the vessel. Kill and choke lines extending downwardly on the outside of the riser are used to pump fluid into the well and conduct fluid from the well after the blowout preventers are closed. The presence of a ball joint in such a riser assembly requires that the kill and choke lines contain flexible sections of sufficient length to permit movement of the assembly at the joint. In the past these flexible sections have normally been made of reinforced high pressure hose. Experience has shown that the hose employed for this purpose is generally subjected to severe wear and that hose life cannot be reliably predicted. The failure of such a hose at a critical point during a drilling operation could result in a blowout and might lead to loss of the well and severe damage to the drilling vessel.

It has been suggested that the hoses normally used to extend the kill and choke lines around the ball joint be replaced by vertical steel pipe loops which extend radially within the plane of the riser. Such loops are less susceptible to wear and should therefore be more reliable than the rubber hoses. Despite this, studies have shown that loops of this type have serious limitations. A particular disadvantage lies in the fact that the flexibility of such a loop is limited and is not the same in all directions. The stresses generated in the pipe making up the loop in response to movement of the riser may be quite high, particularly where the riser motion is at right angles to the plane of the loop. To keep these stresses within acceptable bounds, the loops may have to be of such size that handling of the riser within the well of the drilling vessel becomes a problem.

SUMMARY OF THE INVENTION

This invention provides an improved marine riser assembly which at least in part alleviates the difficulties outlined above. The improved assembly comprises a riser pipe, a ball joint in the riser pipe near the lower end thereof, and steel kill and choke lines which extend down the riser pipe to points below the ball joint, the kill and choke lines being attached to the riser pipe at points above the ball joint and including helical sections which extend around the ball joint and adjacent portions of the riser pipe to an angle of at least 360° at a radial distance from the ball joint and riser pipe sufficient to permit lateral flexing of the ball joint without exceeding the maximum allowable stresses for the helical sections. Tests have shown that this type of an assembly will permit movement of the riser without overstressing the kill and choke lines, that the stress levels in the lines are about the same regardless of the direction in which the riser moves, that such an assembly generally permits control of the kill and choke line stresses without exceeding the size limitations imposed by other parts of the drilling system, and that assemblies of this type have other advantages over those employing hoses and similar equipment used in the past.

The riser pipe employed in the assembly of the invention is normally provided with external brackets or similar members mounted on the pipe surface above the ball joint. The kill and choke lines are attached to these brackets above the joints and extend around the ball joint and adjacent portions of the pipe. The connections may be welded, threaded, flanged, and bolted, or made up with unions or similar fittings which will allow end rotation and differential twisting between the helical sections and adjacent portions of the kill and choke lines. Each helical section extends outwardly from the riser pipe and ball joint and will normally include a nonhelical transition portion near each end where the helical section is attached to the adjacent ends of the kill and choke lines. The coils making up the helical sections will generally have inside diameters ranging from about 1.25 to about four times the outside diameter of the ball joint. Coils between about 1.5 to about three times the ball joint diameter are preferred. The helical sections make at least one complete turn around the ball joint and adjacent portions of the riser pipe and preferably extend around the pipe and ball joint through an angle of at least 540°. The number of turns employed will depend in part upon the type of ball joint used, the vertical dimensions of the joint, the clearance between the helical section and the ball joint, and the mechanical properties of the pipe used in fabricating the helical sections. The number selected should be sufficient to maintain the stresses in the helical sections well below the maximum allowable stresses for the particular steel when the riser is in a position of maximum flexure or displacement. Methods for calculating the stress levels in the helical sections under various conditions have been developed and can be used in designing the apparatus of the invention.

As indicated above, the improved riser assembly of the invention has pronounced advantages over systems used or proposed for use in the past in that it permits the use of high strength steel kill and choke lines which will withstand wear and rough treatment much better than flexible hoses, results in lower stress levels and more uniform stresses under given conditions than do riser assemblies provided with vertical loops or similar devices for accommodating riser motion, often requires less space surrounding the riser pipe and ball joint than systems employed heretofore, and can be constructed to accommodate auxiliary equipment on the riser in the vicinity of the ball joint. These advantages make the improved riser assembly useful in a variety of offshore drilling operations.

BRIEF DESCRIPTION OF THE DRAWINGS

FIG. 1 in the drawings depicts a floating drilling vessel positioned at the surface of a body of water with a marine riser extending downwardly from the drilling vessel to an underwater wellhead located on the floor of the body of water; and FIG. 2 is an enlarged view of the underwater wellhead and marine riser of FIG. 1 showing the ball joint and helical sections of the kill and choke lines.

DESCRIPTION OF THE PREFERRED EMBODIMENT

The drilling vessel 11 in FIG. 1 of the drawing is positioned at the surface 12 of a body of water overlying an underwater wellhead and related equipment. The drilling vessel, which may be a drillship, a drilling barge, a semi-submersible or the like, is held in position over the location by means of mooring lines 13 and 14 which extend downwardly to anchors, not shown, embedded in the bottom 15. Automatic positioning equipment may be used in addition to the mooring system. The vessel will normally be equipped with a derrick 16, a hoist system 17, a rotary table 18, and other conventional equipment employed for drilling purposes. The derrick is usually positioned over a well or slot 19 through which equipment can be raised and lowered, but may be located so that it extends over the side or end of the vessel. The riser assembly of the invention can be employed with a variety of different drilling vessels and may in some cases also be used with platforms or barges having legs which extend downwardly to the bottom of the water.

The underwater wellhead assembly depicted in FIG. 1 includes a temporary base member 20 which is positioned on the ocean floor and is secured by a ball and socket joint or similar member to a foundation pipe 21 or to a conductor pipe 22 extending into the well. The foundation and conductor pipes are cemented in place as indicated by reference numeral 23. As shown more clearly in FIG. 2, a casing head nest 24 which is attached to the conductor pipe extends through the temporary base member 20. A drilling wellhead assembly above the casing head nest includes a detachable wellhead connector 26 of conventional design. Connected above the upper end of this are a ram type blowout preventer 27 and a bag type blow-out preventer 28. A ball joint 29 is connected into the assembly above the blowout preventers and a remotely operated quick disconnect and sealing assembly not shown in the drawing may also be employed. A sectionalized marine conductor pipe or riser 30 and kill and choke lines 31 and 32 extend upwardly to the drilling vessel at the water's surface.

The kill and choke lines of the riser assembly include helical sections 33 and 34 which extend around the ball joint and adjacent sections of the riser pipe. The helical sections shown are located 180° apart and each section extends through an angle of about 1,170°, thus making 3¼ turns about the ball joint and adjacent sections of the pipe. The number of turns provided and the length of each helical section depends in part on the type of ball joint used, the vertical dimensions of the joint, the clearance provided between the helical sections and the outer surface of the ball joint, the angle through which the ball joint must operate, the mechanical properties of the pipe used to fabricate the helical sections, and other factors. In general, each helical section should make at least one complete turn about the riser pipe and ball joint and will preferably extend through an angle of at least 540°. The length of each helical section, measured vertically, will normally be between about 1.5 and about five times the diameter of the coils making up the section. The coils will generally have inside diameters ranging from about 1.25 to about four times, preferably from about 1.5 to about three times, the outside diameter of the ball joint. It is not essential that all of the coils have the same outside diameter and in some cases it may be preferred to design the helical sections so that the coils which are nearer the center of each section and adjacent the ball joint have somewhat greater diameter than those near the ends of the helical sections. The dimensions selected should be such that the stresses in the helical sections will be below the maximum allowable stresses for the steel pipe from which the sections are fabricated when the ball joint and riser are in the position of maximum flexure or displacement. As pointed out earlier, methods for calculating the stress levels under various conditions have been developed and can be used in designing the riser assembly.

It should be noted that each of the helical sections will normally include a nonhelical transition portion near each end. This facilitates the connection of the helical sections to the upper and lower sections of the kill and choke lines above and below the ball joint. In the assembly shown in the drawing, the helical sections are connected to the lower part of the kill and choke lines below the ball joint by means of connections 35, only one of which is shown. They are connected to the upper portions of the kill and choke lines above the ball joint by means of connections 36 and 37. These connections may be welded joints, threaded joints, flanged and bolted connections, unions or similar pipe fittings, or the like. The use of unions or similar fittings which will allow end rotation and differential twisting between the helical sections and adjacent portions of the kill and choke lines is sometimes advantageous but in general the use of welded joints or rigid connections is preferred.

The kill and choke lines are supported above the ball joint and connections with the helical sections by brackets or similar fittings 38 and 39 which are welded or otherwise affixed to the outer surface of the riser pipe. Each bracket or other fitting will normally include a clamp or similar means for engaging the line and holding it securely in place. Below the ball joint and the lower end of the helical sections, the kill and choke lines are supported by brackets or similar fittings 40, only one of which appears in the drawing. These lower brackets or fittings may be mounted on the riser pipe or other components of the assembly. The brackets will preferably be positioned close to the ends of the helical sections in order to provide maximum support and yet facilitate replacement of the sections in the event that such replacement becomes necessary. Any of a wide variety of bracket configurations may be used.

During operation of the riser assembly, flexing of the assembly at the ball joint may occur frequently, in some cases almost continuously. The relatively large diameter of the coils making up the helical sections permits such motion without significant interference. As the ball joint flexes, the helical section coils will tend to be compressed in the direction of motion and expanded in the opposite direction. The resiliency of the coils is such that motion through a relatively large deflection angle produces a relatively small change in the stresses in the steel pipe making up the sections. Studies have shown, for example, that the maximum bending stresses in a 3½ inch O.D. 4142 HS steel line with ½-inch wall thickness in a 585° double helix similar to that shown in the drawing was only 27 ksi for a 10° ball joint deflection angle, well below the nominal yield stress which is in excess of 100 ksi. This maximum bending stress occurred above the ball joint near the upper welded connection in the line. At the same ball joint deflection angle, the maximum torque was 8 foot-kips. The principal normal stress produced by an internal pressure of 10,000 per sq. in., the maximum bending stresses, and the associated torque was only 33 ksi. This was less than one-third of the minimum yield of the steel tubing. The stresses will normally be much lower than this because the most frequent degree of flexure for the assembly tested was less than 4°. At such angles, the stress levels were only about 11 ksi or lower and hence fatigue will normally be minimal.

It will be understood that the approved riser assembly of the invention is not restricted to the precise configuration illustrated in the drawing and that various changes in the shape of the helical sections, the supporting brackets, and other elements may be made.

We claim:

1. A marine riser assembly for use in offshore drilling operations which comprises a riser pipe, a ball joint in said riser pipe near the lower end thereof, and steel kill and choke lines extending down said riser pipe to points below said ball joint, said kill and choke lines being attached to said riser pipe at points above said ball joint and including helical sections which extend around said ball joint and adjacent portions of the riser pipe above and below said joint through an angle of at least about 360° and contain coils having inside diameters from about 1.25 to about 4 times the outside diameter of said ball joint.

2. A riser assembly as defined by claim 1 wherein said kill and choke lines are attached to said riser pipe above and below said ball joint by means of brackets attached to the riser pipe.

3. A riser assembly as defined by claim 1 wherein said helical sections are connected into said kill and choke lines by means of welded connections.

4. A riser assembly as defined by claim 1 wherein said helical sections are connected into said kill and choke lines by means of pipe fittings.

5. A riser assembly as defined by claim 1 wherein each of said helical sections includes a nonhelical transition portion near each end thereof.

6. A riser assembly as defined by claim 1 including two vertically coextensive helical sections spaced approximately 180° apart.

7. A riser assembly as defined by claim 1 wherein the length of each of said helical sections, measured vertically, is between about 1.5 and about five times the diameter of the coils making up said helical section.

8. A riser assembly as defined by claim 1 wherein each of said helical sections extends through an angle of at least 540°.

9. A riser assembly as defined by claim 1 including a plurality of steel lines extending down said riser pipe, each of said lines including a helical section and said lines being located at substantially equal intervals about said riser pipe.

* * * * *